(12) United States Patent
Vayr

(10) Patent No.: US 8,993,828 B2
(45) Date of Patent: Mar. 31, 2015

(54) METHOD OF RADIUM STABILIZING IN SOLID EFFLUENT OR EFFLUENT CONTAINING SUBSTANCES IN SUSPENSION

(75) Inventor: Denis Vayr, Monteynard (FR)

(73) Assignee: Areva NP, Courbevoie (FR)

( * ) Notice: Subject to any disclaimer, the term of this patent is extended or adjusted under 35 U.S.C. 154(b) by 397 days.

(21) Appl. No.: 12/310,085

(22) PCT Filed: Aug. 10, 2007

(86) PCT No.: PCT/FR2007/001365
§ 371 (c)(1),
(2), (4) Date: Jan. 11, 2010

(87) PCT Pub. No.: WO2008/017764
PCT Pub. Date: Feb. 14, 2008

(65) Prior Publication Data
US 2010/0113858 A1 May 6, 2010

(30) Foreign Application Priority Data

Aug. 11, 2006 (FR) ..................................... 06 07295

(51) Int. Cl.
| | |
|---|---|
| A62D 3/30 | (2007.01) |
| A62D 3/33 | (2007.01) |
| G21F 9/10 | (2006.01) |
| C01F 13/00 | (2006.01) |

(52) U.S. Cl.
CPC .. *G21F 9/10* (2013.01); *C01F 13/00* (2013.01)
USPC .......................................... 588/313; 588/315

(58) Field of Classification Search
None
See application file for complete search history.

(56) References Cited

U.S. PATENT DOCUMENTS

| | | | | | |
|---|---|---|---|---|---|
| 2,894,804 | A | * | 7/1959 | Sawyer et al. ..................... | 423/2 |
| 4,146,568 | A | * | 3/1979 | Lange, Jr. ..................... | 423/170 |
| 4,423,007 | A | * | 12/1983 | Weir et al. .......................... | 423/2 |
| 4,654,200 | A | * | 3/1987 | Nirdosh et al. .................... | 423/2 |
| 5,160,482 | A | * | 11/1992 | Ash et al. ......................... | 423/75 |
| 5,188,809 | A | * | 2/1993 | Crocker et al. .................... | 423/2 |
| 5,196,124 | A | * | 3/1993 | Connor et al. .................. | 166/279 |
| 5,322,644 | A | * | 6/1994 | Dunn et al. ........................ | 588/7 |
| 5,787,332 | A | * | 7/1998 | Black et al. ........................ | 423/9 |
| 5,826,162 | A | * | 10/1998 | Aral et al. ......................... | 423/20 |
| 6,656,391 | B1 | | 12/2003 | Bonnerot et al. | |
| 7,282,187 | B1 | * | 10/2007 | Brown et al. ................. | 423/21.5 |
| 7,527,772 | B2 | * | 5/2009 | Kimura ........................... | 423/20 |
| 2002/0192145 | A1 | * | 12/2002 | Oldfield ....................... | 423/555 |
| 2006/0088457 | A1 | | 4/2006 | Kimura | |
| 2009/0185965 | A1 | * | 7/2009 | Delons et al. .................. | 423/70 |

FOREIGN PATENT DOCUMENTS

| | | | |
|---|---|---|---|
| DE | 004322663 | * | 7/1993 |
| DE | 42 41 559 A1 | | 6/1994 |
| DE | 43 22 663 A1 | | 1/1995 |
| DE | 100 05 240 A1 | | 8/2001 |
| FR | 2 562 312 A | | 10/1985 |
| WO | WO 97/36011 | | 10/1997 |
| WO | 2006040458 | * | 4/2006 |

OTHER PUBLICATIONS

Demopoulos, G.P., "Acid Pressure Leaching of a Sulphidic Uranium Ore with Emphasis on Radium Extraction" Hydrometallurgy, vol. 15, issue 2, 219-242 (1985).*
Huck, P.M. et al. "Deposition of 226Ra on Surfaces during precipitation and leaching of (Ba,Ra) SO4" Water Research, vol. 17, issue 10, 1403-1406 (1983).*
Havlik, Borivoj "Radium 226 Liberation from Uranium Ore Processing Mill Waste Solids and Uranium Rocks into Surface Streams-II". Health Physics. vol. 14, 423-430 (1967).*
Moffett et al., "Radium-226 removal from a uranium mill effluent-physical/chemical treatment process development studies," CIM Bulletin, Hydrometallurgy, Jul. 1980, pp. 148-155.
English Translation of pp. 2-5 of Japanese Office Action for corresponding Japanese Patent Application No. JP200-523320.

* cited by examiner

*Primary Examiner* — Melvin C Mayes
*Assistant Examiner* — Sheng H Davis
(74) *Attorney, Agent, or Firm* — Davidson, Davidson & Kappel, LLC

(57) ABSTRACT

Method of stabilizing radium present in radium-containing effluent, in which the effluent and a metal chloride are mixed, then the previously obtained mixture is reacted with a sulfate ion to obtain effluent containing stabilized radium. The chloride can be a barium, strontium or lead chloride. The sulfate ion can be supplied by the addition of sulfuric acid, sulfuric anhydride, soluable sulfate or soluble sulfate salt. The method applies in particular to the treatment of solid radium-containing effluents or effluents containing substances in suspension coming from chemistry or metallurgy of zirconium or treatment of uranium-containing minerals.

27 Claims, No Drawings

METHOD OF RADIUM STABILIZING IN SOLID EFFLUENT OR EFFLUENT CONTAINING SUBSTANCES IN SUSPENSION

The present invention relates to a method by which the radium present in solid radium-containing effluents or in radium-containing effluents containing substances in suspension can be stabilized. The invention is applicable especially to the treatment of effluents from the processing of uranium-containing minerals and of effluents from zirconium chemistry or metallurgy. The present invention relates also to a method for stabilizing the radium in such effluents.

BACKGROUND

Of the radio-elements, radium is one of those with the strictest discharge standards. Many effluents from the extraction of minerals or from the processing of mineral materials are likely to contain radium. That is true of uranium-containing minerals. It is also true of the liquid and semi-solid effluents obtained from the dissolutions and the various washings of zirconium carbochlorination equipment and from the zirconium and hafnium separation processes, for example the separation of zirconium tetrachloride and hafnium tetrachloride by molten salt distillation techniques and by liquid-liquid extraction (MIBK, HCNS), effluents in which a very small amount of radium is generally present.

Radium has the disadvantage of being soluble in water and of being very readily lixiviable, which makes it difficult to store in a dumped solid or semi-solid effluent (sludge).

There are known, for example from U.S. Pat. No. 4,423,007, DE 1005240 or FR2562312, methods for the radium decontamination of or removal of radium from liquid effluents by precipitation of said radium in the form of a double sulfate of radium and barium, $Ba(Ra)SO_4$. These methods are carried out on water or liquid effluents obtained after removal of the substances in suspension, for example by filtration.

SUMMARY OF THE INVENTION

Solid radium-containing effluents or radium-containing effluents containing substances in suspension within the scope of the invention are understood as being various types of effluent which may have various contents of radium. They can be liquid effluents, semi-solid effluents or radium-containing sludges, or alternatively solid effluents or radium-containing waste (e.g. in the form of particles, granules, cake, etc.).

The content and composition of the solid substances constituting solid effluents or of the substances in suspension in liquid effluents, semi-solid effluents or radium-containing sludges are variable, but they include salts and oxides of metals other than radium, which may be dissolved depending on the pH.

According to the invention, liquid effluents are understood as being effluents containing from 5 to 70 g/l, more particularly from 5 to 50 g/l, of substances in suspension, semi-solid effluents or radium-containing sludges are understood as being effluents containing from 70 to 300 g/l, more particularly from 150 to 300 g/l, of substances in suspension, solid effluents or radium-containing waste being characterized by a content of liquid, water or solvent that is very low or zero.

An object of the invention is to provide a method by which the radium present in solid radium-containing effluents or in radium-containing effluents containing substances in suspension can be stabilized.

Another object of the invention is to provid a method by which the radium present in a very small amount in such an effluent, especially in a liquid or semi-solid effluent, can be stabilized. The notion of very small amount is understood to mean a radium content of less than or equal to 1000 Bq per liter or per kilogram of radium-containing effluent, especially less than or equal to 600 Bq/l or kg of radium-containing effluent.

Another object of the invention is to provide a method by which the radium present in larger amounts in an effluent, especially in a semi-solid effluent or in radium-containing waste, can be stabilized. The notion of larger amount is understood to mean a radium content that is greater than 1000 Bq/kg or liter and can reach 1000 Bq/g or ml, especially 600 Bq/g or ml, of radium-containing effluent.

Another object of the invention is to provide a method by which a stabilized radium that is not or is only very slightly lixiviable can be obtained, and to be able to store the radium in stabilized form in a solid or semi-solid by-product that is only slightly or is not subject to lixiviability.

Yet another object of the invention is to provide a method that is beneficial within a context of sustainable development and that is suited to the continuous treatment of solid effluents or effluents containing substances in suspension obtained from an industrial process.

Those objects may be achieved by the present invention, which relates to a method for stabilizing the radium present in a solid radium-containing effluent or in a radium-containing effluent containing substances in suspension, in which method the effluent and a metal chloride are mixed and then the mixture previously obtained is reacted with a sulfate ion to give an effluent containing stabilized radium.

According to a feature of the invention, the liquid radium-containing effluent contains from 5 to 70 g/l, more particularly from 5 to 50 g/l, of substances in suspension.

According to another feature, the semi-solid effluent or radium-containing sludge contains from 70 to 300 g/l, more particularly from 150 to 300 g/l, of substances in suspension.

According to another feature of the invention, the radium-containing effluent is solid.

According to a feature of the invention, the method does not include a step of removing the solid particles prior to mixing with a metal chloride.

According to a feature of the invention, the chloride is a barium, strontium or lead chloride. It can also be a mixture of two or of all three of the above-mentioned chlorides. According to a preferred embodiment of the invention, the chloride is, or comprises, a barium chloride.

According to a feature of the invention, the method may lead to the formation of a double sulfate (that is to say a sulfate of radium and of the metal obtained from the metal chloride). According to an embodiment, the use of barium chloride and of the sulfate ion leads to the formation of the double sulfate $Ba(Ra)SO_4$, which is insoluble.

Stabilization is therefore understood as meaning that the radium is rendered insoluble in water and the aqueous effluents by precipitation. It is also understood as meaning that said insoluble double sulfate is "fixed" or trapped in the substances in suspension in the effluents.

The method may be advantageously carried out with an excess of metal chloride and of sulfate ion relative to the radium, which means that we ensure that more than one molecule of metal and more than one molecule of sulfate ion are present per radium atom.

According to a feature of the invention, the molar ratio between the metal chloride (i.e. the metal ion) and the sulfate ion may be close to 1.

The sulfate ions can be supplied (i) in the form of ions, (2i) by way of a sulfate ion generator capable of generating one or more sulfate ions in the mixture, or (3i) by a mixture of those two species, in any proportions.

According to a preferred embodiment, the sulfate ion is supplied by the addition of sulfuric acid or sulfuric anhydride.

By way of variation, the sulfate ion can be supplied by the addition of a soluble sulfate or of a soluble sulfate salt, for example $Na_2SO_4$.

According to a feature of the invention, the sulfate ion is supplied by an aqueous sulfuric acid solution having a concentration of from 20 to 50% by weight.

By way of variation, the aqueous sulfuric acid solution has a concentration greater than or equal to 90% by weight.

A homogeneous mixture of the effluent and the metal chloride, and then the sulfate ion, allows the maximum amount of radium present to be trapped. The person skilled in the art has the necessary skills to determine the agitation means which allow such a homogeneous mixture to be ensured depending on each situation: nature of the effluent (liquid, semi-solid, solid), radium concentration, volume or mass of effluent to be treated, dimensions of the treatment tank, discharge standard, etc.

The effluent containing stabilized radium can be treated in order to separate the liquid portion of the effluent from the solid portion containing the stabilized radium. It is possible to use flocculation, filtration, or flocculation and filtration. Optionally, the pH of the effluent is adjusted in the light of the flocculation step, as a function of the flocculating agent or flocculation adjuvant.

According to a feature of the invention, the effluent containing stabilized radium is thus neutralized after the double sulfate of metal and radium has formed. Neutralization can be carried out especially with the aid of sodium hydroxide, potassium hydroxide or an analogous product. According to an embodiment, the effluent is neutralized with the aid of a sodium hydroxide solution having a concentration of from 10 to 50%. The purpose of the neutralization is to bring the pH to a value that is advantageously from 7 to 10 and preferably from 8 to 9.

The neutralization can advantageously cause some or all of the other metals present in the effluent to precipitate or re-precipitate and avoid the dissolution of certain oxides, such as uranium oxides, which may be present in radium-containing effluents in the form of soluble sulfates.

According to a feature of the invention, flocculation of the optionally neutralized effluent is carried out by adding a flocculating agent. The person skilled in the art has available a whole range of flocculating agents, especially those used in water treatment. Among these, special mention may be made of polyacrylamide flocculating agents. There can be used as such a flocculating agent, for example, FLOPAM® AN 934 MPM or BPM from SNF, PROSEDIM AS25 from NALCO.

The flocculate obtained from the preceding step can then be treated in order to recover on the one hand a solid or semi-solid residue containing stabilized radium and on the other hand the liquid phase of the effluent, devoid or depleted of radium. Steps of decantation, filtration, or decantation and filtration are means of carrying out this phase of the method. By way of example, the flocculate is either (i) decanted or (2i) filtered or (3i) decanted and then the resulting residue is filtered. Filtration can be carried out on any suitable industrial filter, such as a filter press or a rotary filter.

According to a variant of the invention, the effluent is subjected beforehand to disintegration, especially to ultrasound treatment. This treatment is intended to disintegrate the solid particles suspended in the effluent or the solid constituting the effluent, which are likely to trap radium, such as, for example, zirconium particles when the solid radium-containing effluents or radium-containing effluents containing substances in suspension are waste from carbochlorination. It can take place prior to mixing with the chloride or prior to mixing with the sulfate ion or the sulfate ion generator.

The method according to the invention can be used in the treatment of any liquid or semi-solid effluent (e.g. sludge) or solid effluent (e.g. particles, cake) that may contain radium. The implementation conditions, for example metal/radium ratio, sulfate ion/radium ratio, dimensions of the tanks, residence time, agitation capacities, pre-treatment of the radium-containing particles by ultrasound or another disintegration method, permit the effective treatment of radium-containing waste containing substances in suspension, whatever their radium content, from radium present in trace amounts, or in very small amounts, for example from 0.1 Bq/l or kg of effluent, to the highest amounts encountered in effluents requiring treatment. Advantageously, the method can therefore readily be adapted to the discharge standards that are in force. The method can be used especially in the treatment of effluents from the nuclear industry, more particularly in the treatment of effluents produced during zirconium metallurgy, in the phases of preparation of the zirconium sponge and in the operations of zirconium/hafnium separation. By definition, the expression "zirconium metallurgy" includes all conventional operations carried out on the zirconium mineral and the recoverable metals it contains, principally zirconium and hafnium.

Accordingly, the effluent can be from:
dissolutions or washings of the equipment employed in the carbochlorination of zirconium mineral,
sludges from that carbochlorination process,
dissolutions or washings of the equipment employed in the process of extraction and separation of zirconium or hafnium,
sludges from that process of extraction and separation of zirconium or hafnium, or
a mixture of one or more of those effluents.

The following are given as examples of typical average compositions of solid radium-containing effluents or radium-containing effluents containing substances in suspension:

Carbochlorination waste:

| | |
|---|---|
| C | from 30 to 60% |
| Zr | from 10 to 30% |
| Si | from 1 to 20% |
| Hf | from 0 to 1% |
| Al | from 0 to 1% |
| Ca | from 0 to 0.5% |
| Fe | from 1 to 3% |
| Cr | from 0 to 0.1% |
| K | from 0 to 0.2% |
| Ni | from 0 to 0.1% |
| U | from 0.5 to 3% |
| Y | from 0 to 3% |
| Th | from 0 to 0.5% |

All those elements are insoluble when brought into suspension.

Effluents from carbochlorination plants and from the Zr/Hf separation process, and gas treatment water from such plants:

These effluents can also contain the elements of dissolution of the mineral solvent of the separation process, given that this dissolution can previously be neutralized before being added to the washing effluents of the two plants.

The very variable mixture comprises:

| C  | from 1 to 15%  | insoluble                        |
|----|----------------|----------------------------------|
| Si | from 1 to 10%  | insoluble (SiO2)                 |
| Al | from 5 to 40%  | partly soluble depending on pH   |
| Zr | from 1 to 8%   | partly soluble depending on pH   |
| Fe | from 0.5 to 2% | partly soluble depending on pH   |
| Hf | from 0.5 to 3% | partly soluble depending on pH   |
| Ca | from 1 to 4%   | partly soluble depending on pH   |
| K  | from 1 to 30%  | wholly in solution               |

The radioactive elements are in a small amount (U<0.1%).

An advantage of the present invention is that the method can be used to treat continuously the effluents and waste from an industrial process, for example the effluents produced during zirconium chemistry or metallurgy and especially the particular effluents which have just been described. It is valuable to have available a plurality of pits or tanks in which the effluents from an industrial activity or effluents from a plurality of industrial activities can be stored until the desired volume for starting the treatment is obtained. A plurality of tanks or pits can accordingly be arranged in parallel so that, when the treatment of effluents begins in one of the pits or tanks, the effluents that continue to be produced can be guided towards a different pit or tank awaiting treatment. The installation used allows continuous treatment to be carried out with a variable flow rate.

Accordingly, according to a preferred embodiment of the invention, the solid radium-containing effluents or radium-containing effluents containing substances in suspension are sent continuously to stabilization pits or tanks which are located in parallel, in which they are agitated constantly; when a pit or tank is full, the effluents are sent to the subsequent pit or tank while radium stabilization treatment is carried out in the pit which has just been filled, and so on; once stabilization has been carried out in one pit or tank, the stabilized contents are removed therefrom so that the pit or tank is ready to receive effluents for stabilization again.

DETAILED DESCRIPTION OF THE INVENTION

The invention will now be described in greater detail with the aid of the description of embodiments of the invention given by way of non-limiting examples.

EXAMLE 1

Treatment of Radium-Containing Sludge

The installation comprises, in parallel, three stabilization pits having a volume of approximately 30 m³ and equipped with agitating means with which homogeneous mixing of the volume of effluent they contain can be ensured. The sludge from various steps of the zirconium treatment process is guided to the first pit until the required volume is obtained, and then to the following pit, and so on, while the stabilization treatment starts in the first pit or preceding pit.

In the present example, the effluents are washing liquids from the zirconium/hafnium separation process and from the carbochlorination of zircon; and hafnium residue from the separation process. There will now be described in detail the treatment of a pit where, once mixed homogeneously, the sludge comprised:
Ra226: 4 Bq/kg
Ra223: 12.1 Bq/kg
Ra228: 4.6 Bq/kg 40 ml of barium chloride were added to the stabilization pit in an amount of 150 g/l per m³ of effluent.

Agitation was carried out in order to ensure that the mixture was homogeneous.

There were then added from 15 to 20 ml of 34% sulfuric acid per m³ of the mixture previously obtained.

The whole was agitated in order to ensure that the mixture was homogeneous.

The resulting stabilized effluents were then directed towards a neutralization pit belonging to a group of three neutralization pits each mounted in series following a stabilization pit.

After neutralization with sodium hydroxide, a flocculating agent was added and then decantation was carried out prior to filtration on a filter press. The sludge retained by the filter and also the filtrate were analyzed and the following results were obtained:

| Filtrate: | Ra226:  | 0.57 Bq/l      |
|           | Ra223:  | not measurable |
|           | Ra 228: | <0.12 Bq/l     |
| Sludge:   | Ra226:  | 84 Bq/kg       |
|           | Ra223:  | 63.1 Bq/kg     |
|           | Ra228:  | 35 Bq/kg       |

EXAMLE 2

Lixiviation Tests

The sludge obtained in Example 1 was recovered and lixiviation tests were carried out according to the method described below:

Description of the test: 100 g of residue (sludge) are mixed with 1 liter of water or of acid or of base. The mixture is agitated for a given period of time (3×16 h or 1×24 h) and then filtered. The lixiviates are analyzed (normalized test NF X 31 210, lixiviation test, release test in acidic or basic medium).

The results are as follows:
Lixiviation tests in water for 16 hours:
Ra226: <0.1 Bq/l
Ra223: 2.3 Bq/l
Ra228: <0.15 Bq/l
Lixiviation tests in water for 32 hours:
Ra226: <0.4 Bq/l
Ra223: 0.48 Bq/l
Ra228: <0.12 Bq/l
Lixiviation tests in water for 48 hours:
Ra226: <0.5 Bq/l
Ra223: not measurable
Ra228: not measurable
24-hour lixiviation tests, pH 9, with sodium hydroxide:
Ra226: 0.7 Bq/l
Ra223: 0.89 Bq/l
Ra228: <0.15 Bq/l
24-hour lixiviation tests, pH 5, HCl:
Ra226: 4.9 Bq/l
Ra223: 8 Bq/l
Ra228: 0.4±0.2 Bq/l
24-hour lixiviation tests, pH 5, with $H_2SO_4$
Ra226: <0.1 Bq/l
Ra223: 1.4 Bq/l
Ra228: <0.06 Bq/l
24-hour lixiviation tests before stabilization:
Ra226: 15 Bq/l
Ra223: 5.36 Bq/l
Ra228: 3.4 Bq/l

EXAMLE 3

Treatment of Radium-Containing Sludge

Example 1 was repeated on a mixture of effluents or radium-containing waste containing:
Ra226: 107,000 Bq/l
Ra223: 5,205 Bq/kg
Ra228: 14,500 Bq/kg
After stabilization, the following values were obtained:
Filtrates:
Ra226: <0.2 Bq/l
Ra223: not measurable
Ra228: <0.2 Bq/l
Sludge:
Ra226: 65,700 Bq/kg
Ra223: 2,917 Bq/kg
Ra228: 11,500 Bq/kg

EXAMLE 4

Lixiviation Tests

The lixiviation tests were repeated on the filtration sludge obtained in Example 3.
Lixiviation tests in water for 16 hours:
Ra226: 0.6±0.3 Bq/l
Ra223: 2.27 Bq/l
Ra228: 0.37 Bq/l
Lixiviation tests in water for 32 hours:
Ra226: 0.2±0.1 Bq/l
Ra223: 1.64 Bq/l
Ra228: <0.5 Bq/l
Lixiviation tests in water for 48 hours:
Ra226: 0.3±0.1 Bq/l
Ra223: 0.17 Bq/l
Ra228: 0.09 Bq/l
Lixiviation tests for 24 hours, pH 9, with sodium hydroxide:
Ra226: <0.1 Bq/l
Ra223: not measurable
Ra228: <0.3 Bq/l
Lixiviation tests for 24 hours, pH 5, with HCl:
Ra226: 0.1±0.05 Bq/l
Ra223: not measurable
Ra228: <0.08 Bq/l
Lixiviation tests for 24 hours, pH 5, with $H_2SO_4$
Ra226: 0.2±0.1 Bq/l
Ra223: not measurable
Ra228: <0.3 Bq/l The method according to the invention therefore makes it possible to precipitate and trap the radium in a solid or semi-solid effluent of reduced volume relative to the initial effluents treated. The lixiviation tests additionally show that the radium therein is concentrated in stable form so that the solid or semi-solid effluents can be stored, after optionally removal of all or part of the liquid phase of the effluent, under environmentally acceptable conditions.

These examples of the implementation of the invention must not result in the invention being considered in a restrictive manner. It is clear that the method can be adapted in terms of the choice of reagents, the homogenization means, the incubation times and applied to other solid radium-containing effluents or radium-containing effluents containing substances in suspension.

What is claimed is:

1. A method for producing a solid or semi-solid residue from a starting effluent selected from the group consisting of a solid radium-containing effluent and a radium-containing effluent containing solid substances in suspension, wherein the residue contains stabilized radium and solids or solid substances of the starting effluent comprising the following steps:
   mixing the starting effluent and a metal chloride selected from a group of barium chloride, strontium chloride, lead chloride and a metal chloride mixture having at least two of the barium chloride, strontium chloride or lead chloride to obtain a mixture; and then
   adding a sulphate ion, the sulphate ion reacting with the mixture to provide the solid or semi-solid residue containing the stabilized radium and solids or solid substances of the starting effluent.

2. The method as recited in claim 1 wherein the radium-containing effluent is a liquid and contains from 5 to 70 g/l of substances in suspension.

3. The method as recited in claim 1 wherein the radium-containing effluent is a liquid and contains from 5 to 50 g/l of substances in suspension.

4. The method as recited in claim 1 wherein the effluent is in a state selected from the group consisting of a semi-solid and a sludge and contains from 70 to 300 g/l of substances in suspension.

5. The method as recited in claim 1 wherein the effluent is in a state selected from the group consisting of a semi-solid and a sludge and contains from 150 to 300 g/l of substances in suspension.

6. The method as recited in claim 1 wherein the radium-containing effluent is a solid.

7. The method as recited in claim 1 wherein the molar ratio between a metal ion of the metal chloride and the sulfate ion is close to 1.

8. The method as recited in claim 1 wherein no solid particles are removed prior to mixing with the metal chloride.

9. The method as recited in claim 1 wherein the chloride and the sulfate ions are in excess relative to the radium.

10. The method as recited in claim 1 wherein the sulfate ion is supplied by the addition of one additive selected from the group consisting of sulfuric acid, sulfuric anhydride, soluble sulfate and soluble sulfate salt.

11. The method as recited in claim 10 wherein the sulfate ion is supplied by an aqueous sulfuric acid solution having a concentration of from 20 to 50% by weight.

12. The method as recited in claim 10 wherein the sulfate ion is supplied by an aqueous sulfuric acid solution having a concentration of at least 90% by weight.

13. The method as recited in claim 1 wherein the effluent containing stabilized radium is neutralized.

14. The method as recited in claim 13 wherein the neutralization is carried out with the aid of a hydroxide selected from the group consisting of sodium hydroxide and potassium hydroxide.

15. The method as recited in claim 13 wherein the neutralization is carried out with the aid of a sodium hydroxide solution having a concentration of from 10 to 50%.

16. The method as recited in claim 13 wherein the pH is adjusted to a value of from 7 to 10.

17. The method as recited in claim 13 wherein the pH is adjusted to a value of from 8 to 9.

18. The method as recited in claim 13 wherein with the neutralization, some of or all of the other metals present in the effluent are precipitated.

19. The method as recited in claim 1 wherein flocculation of the neutralized effluent is effected by adding a flocculating agent.

20. The method as recited in claim 19 wherein the flocculate is treated by a process selected from the group consisting of decantation and filtration to recover a solid residue containing the stabilized radium and a liquid phase of the effluent.

21. The method as recited in claim 20 wherein filtration is carried out on a filtration apparatus selected from the group consisting of a filter press and a rotary filter.

22. The method as recited in claim 1 wherein before the chloride or sulfate ion is added, the effluent is subjected to ultrasound treatment.

23. The method as recited in claim 1 wherein the method is applied to the treatment of effluents selected from the group consisting of solid radium-containing effluents and radium-containing effluents containing substances in suspension produced during zirconium metallurgy or chemistry.

24. The method as recited in claim 23 wherein the radium-containing effluent is from a source selected from the group consisting of:
   one selected from the group consisting of dissolutions and washings of equipment employed in carbochlorination of zirconium mineral;
   sludges from the carbochlorination process;
   one selected from the group consisting of dissolutions and washings of equipment employed in a process of extraction and separation of an element selected from the group consisting of zirconium and hafnium;
   sludges from the process of extraction and separation of an element selected from the group consisting of zirconium and hafnium; and
   a mixture of at least one of the effluents.

25. The method as recited in claim 1 wherein effluents are sent continuously to stabilization areas of the types selected from the group consisting of stabilization pits and tanks mounted in parallel, in which the stabilization pits and tanks are agitated constantly; when a stabilization area is full, the effluents are sent to a following stabilization area while radium stabilization treatment is carried out in the stabilization area which has just been filled, wherein, once stabilization has been carried out in the stabilization area, the stabilized contents are removed therefrom so that the stabilization area is ready to receive effluents for stabilization again.

26. The method as recited in claim 1 wherein the effluent selected is a solid.

27. The method as recited in claim 1 wherein the starting effluent includes substances in suspension or solids in the form of non-radioactive substances.

* * * * *